Jan. 16, 1940.  T. W. WALLSCHLAEGER  2,187,336
FASTENER INSTALLATION AND FASTENER MEMBER FOR THE SAME
Filed April 8, 1937
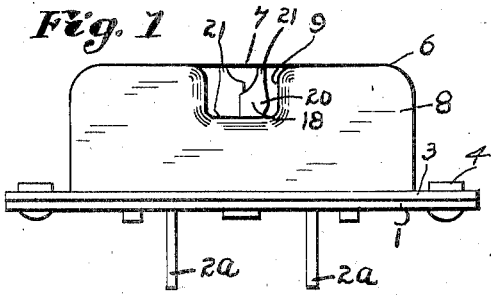
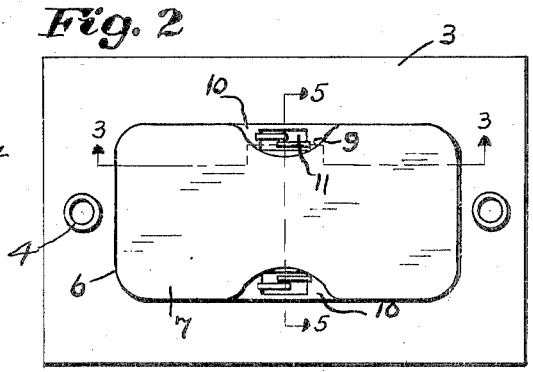
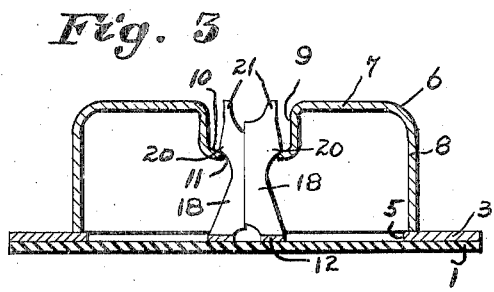
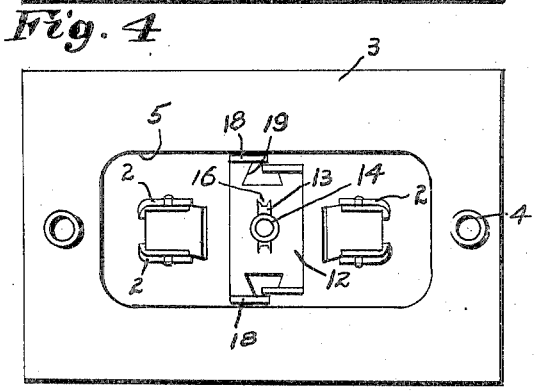
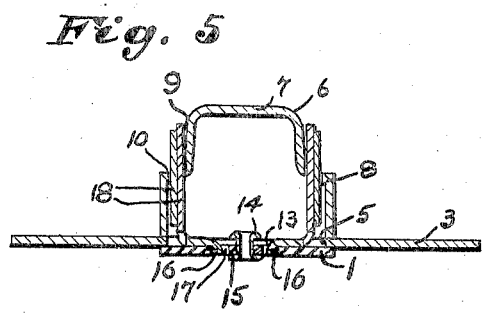
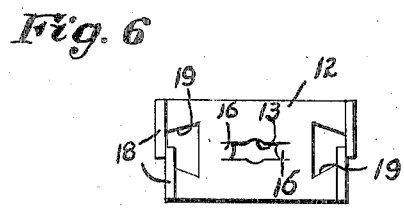
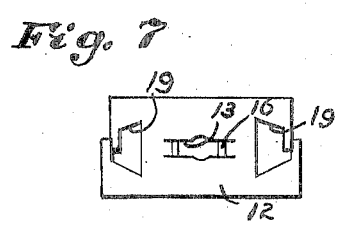
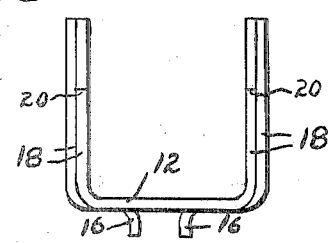
Inventor:
Theodore W. Wallschlaeger.
by Walter S. Jones
Att'y.

Patented Jan. 16, 1940

2,187,336

UNITED STATES PATENT OFFICE 2,187,336

FASTENER INSTALLATION AND FASTENER MEMBER FOR THE SAME

Theodore W. Wallschlaeger, Chicago, Ill., assignor to Cinch Manufacturing Corporation, Chicago, Ill., a corporation of Illinois Application April 8, 1937, Serial No. 135,700

2 Claims. (Cl. 248—223)

This invention relates to fastener members for securing a cap device to a supporting part and installations of the same.

Referring to the drawing, in which I have illustrated a preferred form of my invention:

Figure 1 is a side view of my improved fastener installation comprising a supporting means carrying a fuse clip assembly and a protective cap detachably secured to the support by means of my improved fastener member;

Fig. 2 is a top plan view of the installation shown in Fig. 1;

Fig. 3 is a section taken along the line 3—3 of Fig. 2;

Fig. 4 is a top view of my installation, the protective cap device having been removed;

Fig. 5 is a section taken along the line 5—5 of Fig. 2, a fuse clip being omitted;

Fig. 6 is a top plan view of my fastener member per se;

Fig. 7 is a bottom plan view of the fastener member shown in Fig. 6; and

Fig. 8 is a side view of the fastener member shown in Figs. 6 and 7.

Referring to my preferred installation, as shown in Figs. 1-5 of the drawing, I have shown a supporting part 1 which is preferably of insulating material and adapted to carry a pair of fuse clips 2 (Fig. 4). The supporting part 1 is secured to a metal plate 3 by any suitable means such as the rivets 4. The metal plate 3 has an aperture 5 which is superposed above a portion of the supporting part 1 carrying the fuse clips 2 (Fig. 4). The fuse clips 2, which form no part of my present invention, are secured to the support 1 in spaced relation one to another and provide spring arm portions extending above a surface of the support 1 and adapted to receive opposed ends of a fuse member (not shown) in a manner well known in the art. Each of the clips 2 also has a wire-receiving terminal 2ª extending beneath the support 1, as most clearly shown in Fig. 1. My improved fastener member is secured to the outer surface of the support 1 between the fuse clips 2, in my preferred installation, and is provided with resilient attaching portions having shoulders adapted to engage material adjacent apertures in a cap device 6 for securing the cap to the supporting parts. The cap device 6 is adapted to act as a shield for protecting the fuse member (not shown) when the last-mentioned part is in assembly with the clips 2, as will be understood by those skilled in the art. My improved fastener member is constructed so as to cooperate with the cap device 6 in such a manner that the cap device may be readily attached and detached from the support so as to permit quick and easy access to the fuse member for purposes such as inspecting or replacing the same. Although I have illustrated my fastener member used in connection with a fuse clip assembly, it is understood that I do not wish to be limited by this particular installation as my fastener member is equally adapted to other installations in which it is useful to secure a cap device to a supporting part.

Referring to my preferred protective cap device 6, I have shown an elongated substantially cup-shaped part having an end face 7 and an annular wall 8 extending from the face 7. Free ends of the annular wall 8 adjacent the open end of the cap device are adapted to abut a surface of another part, which, in my preferred installation, is the supporting part 1, but which may be that part to which the fastener member is attached. An indentation 9 is provided in opposite longitudinal sides of the annular wall 8, in my preferred form, adjacent the end face 7. Each of the indentations 9 is formed so as to provide a shelf portion 10 (Figs. 2 and 3) which extends inwardly from the annular wall 8 in substantially perpendicular relation thereto and which, in my preferred form, is disposed in substantially parallel relation with the plane of the support 1. Each of the shelves 10 has an aperture 11 therein for receiving stud portions of my fastener member in a manner to be described.

Referring now to the specific form of fastener illustrated, I have shown one which is made from a single piece of sheet metal having a base portion 12. The base portion 12 has an elongated aperture 13 therein adapted to receive attaching means such as a tubular rivet 14 (Fig. 5) which extends through the aperture 13 of the base 12 and an aperture 15 in the support 1 for securing the fastener member to the support. Adjacent opposed ends of the aperture 13 I have provided integral lugs 16 extending downwardly out of the plane of the base 12 and adapted to enter into apertures 17 in the support 1 (Fig. 5) for preventing rotation of the fastener member relative to the support 1 after the fastener has been secured thereto. As a means for securing the cap device 6 to the support I have provided a snap fastener attaching means which comprises two pairs of socket-engaging portions integral, in my preferred form, with opposed ends of the base 12. The socket-engaging portions 18—18 of each pair are arranged somewhat in overlapping relation (Figs. 4 and 6) and extend at substantially a right angle from the base 12 (Fig. 8) so that they may have a scissors-like action when engaged with or disengaged from material adjacent the apertures 11 of the cap device. In order to secure maximum resiliency for the operation of the socket-engaging portions 18—18 of each pair, I have provided apertures 19 in the base 12 (Figs. 5, 6 and 7) permitting a twisting action of those portions of the base 12 with which the socket-engaging portions 18—18 are connected. Outer edges of the portions 18—18 are shaped to converge relative to each other at points intermediate the base 12 and the outer free ends of the attaching portions and then diverge at their free ends thereby providing shoulder means 20 (Figs. 1 and 3) for holding the attaching portions in engagement with the cap device 6 in the manner most clearly shown in Fig. 3. Relatively slender prong portions 21 are preferably provided at the outermost free ends of the attaching portions 18 adjacent diverging edges thereof and adapted to be squeezed together by a suitable tool (not shown) for moving the attaching portions 18—18 of each pair toward each other to permit detachment of the cap 6 from the support.

Attachment of the parts of my installation is a relatively simple matter and is carried out by first securing the fastener member to the supporting part by a means such as hereinabove described. Next the cap device is moved toward the fastener so that the shoulders 20 of the attaching portions extend through the apertures 11 of the cap and engage the material of the cap adjacent the apertures on an opposite side of the shelf from the support 1, as most clearly shown in Figs. 2 and 3. The free edges of the annular wall 8 of the cap engage the outer surface of the plate 3 so as to shield completely the fuse clip assembly. Through reason of the fact that the shelf 10 of the cap device is disposed below the plane of the end face 7, the free ends of the attaching portions 18 do not extend beyond the plane of the end face with the result that the cap presents a substantially smooth and uninterrupted end surface. To detach the cap from assembly with the support, the prong portions 21—21 of each pair of attaching portions are squeezed together by a suitable tool whereby the shoulders 20—20 of each pair are moved toward each other and out of engagement with the material of the cap adjacent the apertures 11. The cap device may now be slipped easily over the free ends of the attaching portions. It is understood that I do not wish to be limited by the indented form of cap device illustrated and described because it is apparent that the indentations are provided chiefly for the purpose of improving the neatness of the cap device and are not essential to proper mechanical cooperation between a fastener member such as that hereinabove set forth and other forms of apertured cover devices or the like parts.

As a result of my invention I have provided a separable protective cap installation of relatively simple construction which may be a fuse housing, as described, or other suitable device for a similar purpose. The parts of my installation are inexpensively manufactured and capable of being easily put together so as to provide a neat and compact assembly.

Although I have illustrated and described a preferred form of my invention, I do not wish to be limited thereby because the scope of my invention is best set forth in the following claims.

I claim:

1. A fastener installation of the class described comprising a supporting part, a cup-shaped part adapted to be secured to said support and having a back portion and side and end flanges connected thereto, at least two of said flanges being formed with an inwardly extending apertured shelf portion providing recesses in the outer wall adjacent the back portion communicating with the interior of the cup-shaped part by an aperture in the shelf, and a snap fastener member having a base portion secured to said supporting part and formed at opposite ends with a pair of resilient attaching portions extending therefrom in substantially perpendicular relation thereto, each pair of attaching portions being provided with a shoulder portion and outwardly tapering end whereby when the cup-shaped part is placed upon the support, the outwardly tapering ends of the attaching portion may be passed through the apertures of said shelf portion and the shelf portion snapped under the shoulder portion of said attaching portions to replaceably hold the cup-shaped part to the support with the base and attaching portion of the fastener, except the tapering head ends, confined within the cup-shaped part.

2. A fastener installation of the class described comprising a supporting part, a cup-shaped part adapted to be secured to said support and having a back portion and side and end flanges connected thereto, at least two of said flanges being formed with an inwardly extending apertured shelf portion providing recesses in the outer wall adjacent the back portion communicating with the interior of the cup-shaped part by an aperture in the shelf, and a snap fastener member having a base portion provided with integral means for attaching it to said supporting part and formed at opposite ends with a pair of resilient attaching portions extending therefrom in substantially perpendicular relation thereto, each pair of attaching portions being provided with a shoulder portion and outwardly tapering end whereby when the cup-shaped part is placed upon the support, the outwardly tapering ends of the attaching portion may be passed through the apertures of said shelf portion and the shelf portion snapped under the shoulder portion of said attaching portions to replaceably hold the cup-shaped part to the support with the base and attaching portion of the fastener, except the tapering head ends, confined within the cup-shaped part.

THEODORE W. WALLSCHLAEGER.